United States Patent [19]

McCue et al.

[11] Patent Number: 4,677,086
[45] Date of Patent: Jun. 30, 1987

[54] SHAPED WOOD-BASED ACTIVE CARBON

[75] Inventors: John C. McCue, Covington, Va.; Albert J. Repik, Charleston; Charles E. Miller, Jr., Mt. Pleasant, both of S.C.

[73] Assignee: Westvaco Corporation, New York, N.Y.

[21] Appl. No.: 611,595

[22] Filed: May 18, 1984

[51] Int. Cl.[4] ..................... B01J 20/12; B01J 20/20
[52] U.S. Cl. ........................... 502/62; 502/80; 502/413; 123/519; 55/387
[58] Field of Search ............ 502/62, 80, 413; 123/519; 55/387

[56] References Cited

U.S. PATENT DOCUMENTS

| Re. 25,400 | 6/1963 | Doying ..................... 502/62 |
| 617,079 | 1/1899 | Catlett ..................... 502/62 |
| 1,524,843 | 2/1925 | Ruprecht ..................... 502/62 |
| 1,589,081 | 6/1926 | Adler ..................... 502/80 X |
| 1,985,840 | 12/1934 | Sadtler ..................... 502/80 X |
| 2,108,860 | 2/1938 | Kauffman ..................... 502/62 |
| 2,391,312 | 12/1945 | Ewing et al. ..................... 502/80 |
| 2,455,509 | 12/1948 | Luaces ..................... 18/55 |
| 2,951,087 | 8/1960 | Hauser ..................... 502/62 |
| 3,454,502 | 7/1969 | Hiltgen et al. ..................... 252/428 |
| 3,592,779 | 7/1971 | Kiikka ..................... 252/421 |
| 3,864,277 | 2/1975 | Kovach ..................... 252/423 |
| 3,960,761 | 6/1976 | Burger et al. ..................... 252/421 |
| 3,960,771 | 6/1976 | Tanaka et al. ..................... 502/413 |
| 4,029,600 | 6/1977 | Schmitt, Jr. et al. ..................... 252/444 |
| 4,051,098 | 9/1977 | Takemura et al. ..................... 260/38 |
| 4,124,529 | 11/1978 | Juntgen et al. ..................... 252/421 |
| 4,338,106 | 7/1982 | Mizuno et al. ..................... 55/387 |
| 4,518,704 | 5/1985 | Okabayashi et al. ..................... 502/413 |

FOREIGN PATENT DOCUMENTS

| 69146 | 4/1984 | Japan ..................... 502/413 |
| 341233 | 1/1931 | United Kingdom ..................... 502/413 |

*Primary Examiner*—Carl F. Dees
*Attorney, Agent, or Firm*—Terry B. McDaniel; Richard L. Schmalz

[57] ABSTRACT

A shaped activated wood-based carbon with essentially no pore volume in pores greater than one micron in diameter and a higher apparent density is prepared from an active granular wood-based carbon with a significant pore volume in pores greater than one micron in diameter and a lower apparent density by the invention process of grinding the active granular wood-based carbon to a fine powder, mixing the ground carbon with a liquid selected from water or other polar molecule and a bentonite clay binder, shaping the mixture, drying the shaped active carbon to remove the liquid, and heat-treating the dried product to calcine, or fix, the clay binder.

16 Claims, 1 Drawing Figure

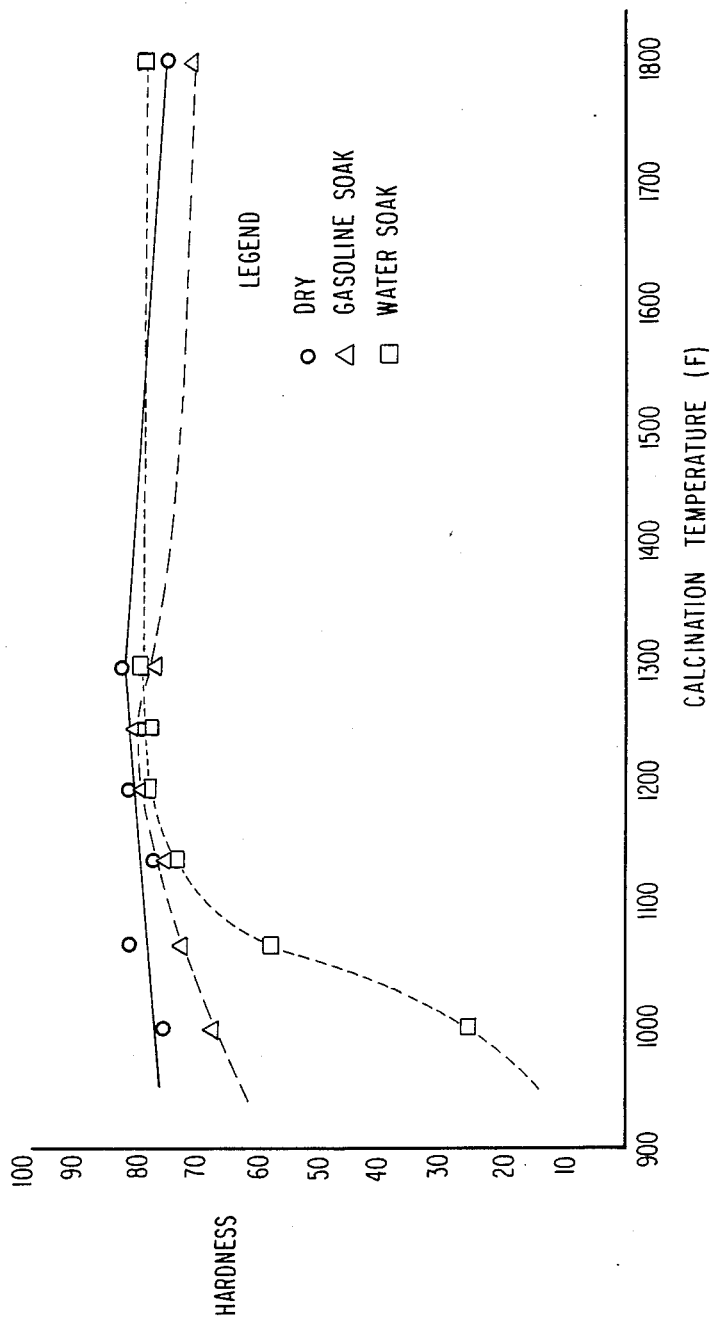

SHAPED WOOD-BASED ACTIVE CARBON

BACKGROUND OF THE INVENTION

(1) Field of the Invention

This invention relates to an active carbon formed into a granular or other suitable shape by using bentonite clay as a binder. More particularly, the invention deals with a method for producing a shaped wood-based activated carbon with essentially no pore volume in pores greater than one micron in diameter. Thus, the invention product is particularly well adapted for use as contact mass in adsorption and catalytic processes.

(2) Description of the Prior Art

Granular carbons and carbon pellets are typically used in columns or beds for gas and vapor systems and also for processing a number of liquids. To qualify for this application, a carbon must posses sufficient mechanical strength to withstand the abrasion incident to continued use. Gas-adsorbing carbons should be as dense as is consistent with high adsorptive power so as not to require a large space for the adsorber. The development of high adsorptive power during thermal activation, however, is accompanied by a loss of mechanical strength and density; therefore, some compromise is required in selecting the degree to which the activation is conducted.

Activated carbon currently produced from wood waste has an exceptionally high internal surface area and activity level. However, the granular portion is relatively soft and its shape is irregular. Therefore, application of granular wood-based carbon in general gas phase and liquid phase adsorption is limited by a number of constraints, to wit: (1) its low apparent density results in low volumetric adsorption capacity; (2) its low hardness results in a high fines generation rate (dusting); and (3) its limited maximum particle size and its irregular granular shape both result in a high pressure drop in gas phase applications. It has been found that changes in hardness and shape can be effected by agglomerating or shaping an active wood-based carbon with bentonite clay in the particular manner of the invention which achieves properties which provide shipping advantages by reducing dusting tendancies, as well as properties suited to gas and liquid phase applications. Particularly, invention process provides shaped active carbon the maximum particle size of which is limited only by the equipment used in the shaping process.

Shaping of carbons, generally, is taught in the prior art. U.S. Pat. No. 2,455,509, for example, teaches a method of extruding irregularly shaped carbon rods but does not teach any particular binder material. The organic binders most commonly used are substances which when heat-treated in an inert or non-oxidizing atmosphere yield a high proportion of fixed or residual carbon.

Thus, U.S. Pat. No. 3,454,502 teaches activated carbon tablets formed from powdered activated carbon with water soluble aliphatic petroleum hydrocarbon sulfonate detergent as binder, and U.S. Pat. No. 3,592,779 teaches the use of acid sludge formed by the reaction of a mineral acid with a relatively high molecular weight hydrocarbon as a binder for particulate carbon and the subsequent activation thereof. U.S. Pat. No. 3,864,277 teaches a hard granular activated carbon and preparation by extrusion of a mixture of a carbonaceous material, a binder, and an inorganic activating agent (phosphoric acid). The binders taught are lignosulfonates and polyvinyl alcohols which are soluble or emulsifiable in water or phosphoric acid solutions.

U.S. Pat. No. 3,960,761 discloses a method of production of strong active carbon moldings by extruding or briquetting low ash mineral coals with phenols and aldehydes used as binders. In teaching carbon particulates comprising carbon black spheres and a carbon binder with desirable pore size distribution, U.S. Pat. No. 4,029,600 discloses certain polymers and coal tar pitch as the carbon binder. Also, U.S. Pat. No. 4,051,098 discloses a one step phenol-formaldehyde resin, a modified phenol-formaldehyde resin or a mixture thereof as a binder in a process for manufacturing a shaped active carbon. The patentees note that the resins do not damage the adsorption property of the active carbon due to their markedly high carbonization rates in the high temperature treatment employed in the manufacturing process.

Finally, U.S. Pat. No. 4,124,529 teaches carbonaceous adsorbents produced by shaping the carbon with elastomeric plastics and thermoplastic materials such as polyvinyl alcohol, polypropylene, and polyethylene.

It has now been discovered that bentonite clay, a non-carbon containing material, when mixed with a pulverized, activated wood-based carbon in a liquid and agglomerated or shaped, dried, and heat-treated, performs as an effective carbon binder to produce a shaped active carbon material with higher apparent density and hardness, reduced pressure drop in gas phase applications, and increased volumetric adsorption capacity. Particularly surprising is the increased volumetric adsorption capacity of the shaped product in view of the fact that the weight bases adsorption capacity has been decreased by the presence of the inert clay binder. Advantageously, the extruded carbon product of this invention produces particles of uniform activity throughout. Prior art thermally activated granular carbon particles exhibit high activity on the outer surface with decreasing activity toward the center.

SUMMARY OF THE INVENTION

A shaped activated wood-based carbon with essentially no pore volume in pores greater than one micron in diameter and a higher apparent density is prepared from an active granular wood-based carbon with a significant pore volume in pores greater than one micron and a lower apparent density by the invention process of grinding the active granular wood-based carbon to a fine powder, mixing the ground carbon with a liquid selected from water or other polar molecules and a bentonite clay binder, shaping the mixture, drying the shaped active carbon to remove the liquid, and heat-treating the dried product to calcine, or fix, the clay binder.

DESCRIPTION OF THE PREFERRED EMBODIMENT(S)

The invention process involves the steps of (1) grinding activated wood-base carbon to a fine powder, (2) mixing the ground carbon with a liquid and a binding amount of bentonite clay, (3) agglomerating or shaping the mixture, (4) drying to remove the liquid to produce shaped carbon which may be easily dispersed to its fine powder form upon contact with water, and subsequently, (5) heat-treating the shaped carbon at temperatures from above 700° F. to about 1800° F., to fix the clay binder (i.e., destroying the water swelling character thereof).

Wood-based active carbon typically has a significant pore volume in pores greater than one micron (10,000 angstroms) in diameter (0.6 cc/gm). Pores this size do not contribute to the carbon's adsorption capacity. Indeed, the major result of this pore volume is lower product apparent density. Processing the wood-based active carbon, however, results in a shaped active carbon product with essentially no pore volume in pores greater than one micron in diameter and yields a product with increased apparent density. Therefore, although the weight basis adsorption capacity is decreased by the presence of the inert clay binder, the volumetric capacity of the carbon is increased, as shown in the following table.

TABLE I

| Property | Granular Nuchar ® WV—B[1] | Granular WV—B, Pulverized and Extruded with 14% Clay Binder |
| --- | --- | --- |
| Apparent Density, lb/ft$^3$ | 17.9 | 21.2 |
| CCl$_4$ capacity, gm/100 gm | 105.1 | 96.1 |
| CCl$_4$ capacity, gm/100 cm$^3$ | 30.2 | 32.7 |
| Butane capacity, gm/100 gm | 40.7 | 37.8 |
| Butane capacity, gm/100 cm$^3$ | 11.7 | 12.9 |

[1]Westvaco commercial wood-based active carbon.

The removal of pores greater than one micron in diameter and the resultant increase in apparent density was observed to occur even when using a relatively coarse grind in the pulverizing step, such as 60% of the sample passing a 325 mesh (44 micron) screen.

The mutual weight proportions of the carbon and clay binder are suitably between 25:75 and 95:5, especially between 80:20 and 90:10, respectively. The mixture of carbon and clay is formed in the presence of a liquid selected from water or other polar molecule, which can be removed after the forming, or shaping step. The mixture is shaped wet; the proportion of liquid in the mixture is chosen to give the consistency required for the shaping method to be used, taking into account that liquid tends to be withdrawn from the mixture by adsorption by the carbon and clay, thus stiffening the mixture.

The proper operation of the mixing step has been found to be critical in determining the operability of the extrusion step and setting product properties. Because the bentonite swells in water and the swelled platelets provide the required lubrication to develop plasticity, the amount of available water controls the level of plasticity. As noted, the amount of available water is predetermined by the total water content of the mix and the amount adsorbed into the carbon internal pore structure. The higher the moisture level, the less viscous the plastic mass and, therefore, the lower the extrusion pressure. Simply blending together the components in the proper proportions is not all that is required. For proper operation of the extruder, the batch must be mixed in a high shear mixer until the viscosity properties of the mix do not change with time. If the viscosity is still changing, unacceptable extruder operation results. The preferred mixer is a low speed, high shear type muller mixer, although any high shear type is probably acceptable.

The preferred method of agglomerating or shaping the wet carbon-clay mixture is by extrusion for pellet formation with a standard auger extruder with a non-compressive screw. However, other shaping methods are acceptable, such as a ram extruder, pellet mill, disc agglomerator, or briquette press.

The extruded shaped carbon is heated at drying temperatures up to 700° F. to remove the liquid therefrom. At temperatures above about 500° F., heating should be conducted in an inert atmosphere to prevent ignition of the carbon.

Following the drying step, the dried shaped carbon may be heat treated at temperatures from about 700° F. to 1800° F. to calcine, or fix, the clay binder. Typically, the heat treatment may be conducted in a nitrogen environment; however, for that portion of the temperature range up to 1,300° F., steam may be economically employed to displace oxygen. While a rotary kiln is preferred for the heat treatment step, other types of equipment are acceptable. The heat treatment temperature is dependent upon the pellet dispersal properties desired.

Two types of bentonite clay are distinguished—a sodium bentonite (also called Wyoming or western) and a calcium bentonite (also called southern). Western bentonite clay has the property of swelling many times it original volume when added to water. High temperature treatment of the bentonite prevents swelling in water. For the shaped product, it is possible to control the pellets' physical changes on water contact by controlling the heat treatment temperature. Specific controlled responses for extruded pellets made by the invention process with 14% western bentonite binder are reported in Table II as follows:

TABLE II

| Heat Treatment Temperature (°F.) | Product Properties |
| --- | --- |
| 700° F. | At 12% solids content or greater in water, the pellet immediately disintegrates, but the solids do not settle out. |
| 850° F. | At any solids content, the pellets disintegrate and the solids settle from the water into a cake. |
| 1,000° F. | The pellets become very soft in water, but remain intact. (See FIG. 1.) |
| 1,200° F. or greater | The pellet hardness on water contact. Shows negligible change. (See FIG. 1.) |

Thus, for pellets heated at 700° F. or less, the wetting and dispersal rate, with little or no agitation, is much faster than for pulverized wood-based carbon. By taking advantage of these properties, products with tailored dispersal rates can be manufactured. Such products would provide handling with less dust than powdered carbon products, yet would readily disperse to the powder form on contact with water.

A specific embodiment of the invention relates to the application of the shaped wood-based carbon prepared by the invention process in an evaporative emission control device for adsorbing the gasoline vapors which emit from the carburetor of an automobile and also to adsorb the gasoline vapors which emit from the fuel tank. Accordingly, the shaped carbon is disposed in a suitable canister and arranged to receive the vapors from the carburetor and/or fuel tank. Preferably, the shaped carbon is disposed in such a manner that the evaporated fuel from the carburetor and/or fuel tank must pass through the shaped carbon where it can be adsorbed to prevent it from exhausting into the atmosphere.

The following examples are provided to illustrate further the novelty and utility of the present invention.

EXAMPLE 1

To show both the operability of the invention process and the application of the invention product in evaporative emission control for adsorbing gasoline vapors, a commercial wood-based granular active carbon produced by Westvaco Corporation, designated as WV-B, was ground to a fine powder and mixed with water and 14% (based on the weight of the carbon) sodium bentonite clay in a high shear intensive mixer to form a hand packable mass. The mixture was shaped into cylindrical pellets having a diameter of 3.2 millimeters by extrusion through a standard auger extruder with a non-compressive screw and multihole die plate followed by cutting with a knife cutter into lengths of approximately 3-6 millimeters. The formed pellets were then oven dried in air at about 200° F. The drying step was followed by a heat treatment in an inert atmosphere at 1,000° F. for 10 minutes.

The shaped carbon thus formed was disposed in a canister, and the canister was tested as an evaporative emission control device for adsorbing gasoline vapors. The test results were compared with the automotive manufacturer's specifications, as well as the results of similar testing of devices using BPL-3 coal-based active carbon and WV-B granular wood-based active carbon. The comparison is presented in Table III.

TABLE III

EXTRUDED WOOD-BASED CARBON WV—BX
COMPARISON TO BPL-3,* WV—B AND AUTOMOTIVE SPECIFICATIONS

| | Automotive Specification | BPL-3 (Coal-base) | WV—B (Granular Wood Base Active) | WV—BX** |
|---|---|---|---|---|
| Apparent Density (lb$^3$) | 18.7-25 | 22.8 | 14.4 | 21.2 |
| Apparent Density (g/cm$^3$) | .3-.4 | .365 | .23 | .340 |
| Abrasion Test | 55 minimum | 64 | 42 | 89 |
| Particle Size | 4 × 18 | 6 × 16 | 4 × 14 | 3.2 mm diameter |
| Pressure Drop (inches water column/canister) | 2.5 | 2.4 | 1.5 | 0.75 |
| Ash Wt. % | — | 9.9 | 3.4 | 18.9 |
| Volume Capacities (Units = gm/100 cm$^3$) | | | | |
| Butane Capacity | | 12.4 | 9.4 | 12.7 |
| Butane Working Capacity | | 10.4 | 8.6 | 10.5 |
| CCl$_4$ Capacity | | 33.2 | 25.9 | 32.7 |
| CCl$_4$ Working Capacity | | 24.5 | 22.9 | 25.4 |
| Automotive Cycle Test Gasoline Working Capacity | | 4.34 | 3.61 | 4.66 |

*Granular coal-based active commercial carbon currently used in automotive emission control canisters.
**WV—B carbon extruded with 14% bentonite.

The data presented in Table III show that the shaped wood-based carbon prepared according to the invention process meets the automotive specifications and favorably compares to the standard commercial carbon in this application.

EXAMPLE 2

To determine the heat treatment temperature required to obtain hardness stability upon prolonged contact with water or gasoline, carbon pellets formed according to the procedure of Example 1 (through the drying step) were calcined at temperatures of B 1,000° F., 1,070° F., 1,140° F., 1,200° F., 1,300° F. and 1,800° F. for a treatment time of 10 minutes. A seven and one-half inch rotary furnace was used; and the atmosphere for calcination was steam at all tested temperatures except 1,800° F., where nitrogen was employed.

The treated pellets were separately soaked in water and gasoline for 10 days and tested for hardness by a standard crushing strength test procedure. The effect of calcination temperature on pellet hardness was determined by graphing the hardness rating of each sample, as well as ratings of dry, unsoaked pellets similarly treated, representing the original sample hardness. The graph appears as FIG. 1.

The heat treatment temperature at which the gasoline soaked pellets approach their original hardness is 1,000° F. For water soaked pellets, a heat treatment of at least 1,100° F. is necessary to compare favorably with the original sample in hardness after 10 days. No real advantage is observed for treatment above 1,300° F. Therefore, the preferred heat temperature range for wood-based active carbons shaped according to the invention process for use in emission control of gasoline vapors is from 1,000° F. to 1,300° F.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A composition comprising active wood-based carbon particles and, as a binder therefor, a bentonite clay in an amount of from 5% to 75% by weight, based on the carbon, selected from the group consisting of sodium bentonite and calcium bentonite wherein the clay is characterized by having been subjected to a calcination treatment conducted at from about 700° F. to about 1,800° F. in an oxygen-free atmosphere subsequent to its combination with the carbon wherein said composition is characterized by a higher apparent density over that of the carbon alone.

2. The composition of claim 1 wherein the calcination treatment is conducted at from about 1,000° F. to about 1,300° F.

3. The composition of claim 1 wherein the bentonite clay is sodium bentonite.

4. A process for preparing a shaped carbon composition from a granular wood-based active carbon material comprising:
(a) grinding the granular wood-based active carbon to a fine powder;
(b) mixing with the ground wood-based active carbon from 5% to 75%, by weight, of bentonite clay, based on the carbon, selected from the group consisting of sodium bentonite and calcium bentonite, in the presence of a liquid, selected from the group consisting of water and other polar molecules;
(c) forming the shaped carbon composition from the mixtures of the ground carbon and clay;
(d) subjecting the shaped carbon to sufficient heat to remove the liquid therefrom to provide dried shaped carbon, which is characterized by being easily dispersed in its fine powder form upon contact with water; and
(e) heat treating the dried, shaped carbon at from about 700° F. to about 1,800° F. in an inert atmosphere.

5. The process of claim 4 wherein the shaped carbon is subject to drying temperatures up to about 700° F.

6. The process of claim 5 wherein the drying step is conducted in an inert atmosphere at temperatures from about 500° F. to about 700° F.

7. The process of claim 4 wherein the ground carbon and clay are mixed in the presence of water by a high shear intensive mixer and the clay is sodium bentonite in an amount of from 5% to 75%, based on the weight of the carbon.

8. The process of claim 4 wherein the sodium bentonite is present in an amount of from 10% to 20%, based on the weight of the carbon.

9. The process of claim 4 wherein the forming step is accomplished by extrusion, agglomeration, or pressing.

10. The process of claim 6 wherein the forming step is accomplished by extrusion.

11. The process of claim 4 wherein the dried carbon is heat treated at from about 1,000° F. to about 1,300° F. in an atmosphere of steam.

12. The process of claim 4 wherein the dried carbon is heat treated at about 1,800° F. in a nitrogen atmosphere.

13. The process of claim 4 wherein the heat treatment is conducted in a rotary furnace.

14. An evaporative emission control device for adsorbing the gasoline vapors comprising a shaped carbon composition prepared by mixing fine particles of active wood-based carbon with from 5% to 75%, by weight, of bentonite clay, based on the carbon, selected from the group consisting of sodium bentonite and calcium bentonite, in the presence of sufficient water to form a hand packable mass, shaping the carbon-clay mixture by extrusion, removing the free water from the shaped product, and subjecting the shaped product to calcination temperatures of from about 1,000° F. to about 1,300° F. in an inert atmosphere.

15. The process of claim 10 wherein the clay is added in the amount of from 10% to 20%, based on the weight of the carbon and the inert atmosphere of calcination is steam.

16. The process of claim 11 wherein the clay is sodium bentonite in the amount of 14%, based on the weight of the carbon.

* * * * *